(12) United States Patent
Yasuda (10) Patent No.: US 9,625,735 B2
(45) Date of Patent: Apr. 18, 2017

(54) IMAGE STABILIZER, LENS APPARATUS, AND IMAGE PICKUP APPARATUS

(71) Applicant: CANON KABUSHIKI KAISHA, Tokyo (JP)

(72) Inventor: Hiromu Yasuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/589,423

(22) Filed: Jan. 5, 2015

(65) Prior Publication Data
US 2015/0195460 A1  Jul. 9, 2015

(30) Foreign Application Priority Data

Jan. 8, 2014  (JP) .................................. 2014-001282

(51) Int. Cl.
| H04N 5/232 | (2006.01) |
|---|---|
| G02B 27/64 | (2006.01) |
| G02B 7/10 | (2006.01) |

(52) U.S. Cl.
CPC ........... *G02B 27/646* (2013.01); *H04N 5/232* (2013.01); *H04N 5/23287* (2013.01); *G02B 7/102* (2013.01)

(58) Field of Classification Search
CPC .. H04N 5/232; H04N 5/23248; H04N 5/2328; H04N 5/23287
See application file for complete search history.

(56) References Cited

U.S. PATENT DOCUMENTS

| 2007/0280668 A1* | 12/2007 | Kubo | G02B 7/04 396/133 |
|---|---|---|---|
| 2009/0015709 A1* | 1/2009 | Kimura | H04N 5/232 348/374 |
| 2011/0150442 A1* | 6/2011 | Ollila | G03B 3/10 396/55 |
| 2011/0157367 A1* | 6/2011 | Chang | H04N 5/2254 348/159 |
| 2011/0286099 A1* | 11/2011 | Shiraki | G02B 7/023 359/557 |
| 2014/0099087 A1* | 4/2014 | Yasuda | G02B 27/646 396/55 |
| 2014/0119717 A1* | 5/2014 | Yasuda | G02B 27/646 396/55 |
| 2015/0010296 A1* | 1/2015 | Yasuda | G02B 27/646 396/55 |
| 2015/0153584 A1* | 6/2015 | Yasuda | G02B 7/023 359/557 |
| 2015/0237259 A1* | 8/2015 | Yasuda | G02B 27/646 348/208.11 |

FOREIGN PATENT DOCUMENTS

JP      09-105973 A    4/1997

* cited by examiner

*Primary Examiner* — Abdelaaziz Tissire
(74) *Attorney, Agent, or Firm* — Cowan, Liebowitz & Latman, P.C.

(57) ABSTRACT

An image stabilizer includes a movable member holding a lens, a tilting unit configured to rotate around a predetermined point to tilt the movable member relative to an optical axis, and a driving unit configured to move a position in an optical axis direction of the movable member relative to the tilting unit, the movable member is configured to tilt such that a radius of curvature around the predetermined point varies according to the position in the optical axis direction.

10 Claims, 10 Drawing Sheets

FIG. 10

IMAGE STABILIZER, LENS APPARATUS, AND IMAGE PICKUP APPARATUS

BACKGROUND OF THE INVENTION

Field of the Invention

The present invention relates to an image stabilizer that is installed in an optical apparatus such as a lens apparatus or an image pickup apparatus like a digital camera or a digital video camera.

Description of the Related Art

An image stabilizer installed in a digital camera or the like is configured to move a movable member that holds a correcting lens or an image pickup element as an image-blur correcting optical system in two directions (yaw and pitch directions) orthogonal to an optical axis. In this configuration, the influence caused by a hand shake generated in an image shooting can be absorbed. Japanese Patent Laid-open No. H09-105973 discloses a configuration in which a movable member that holds a correcting lens is rotationally moved in two direction on a spherical surface around a predetermined point as a spherical center on the optical axis of the correcting lens.

Lens units that constitute an optical apparatus move in the optical axis direction when zooming or focusing is performed. When the correcting lens is rotationally moved, it is preferred that a radius of curvature of the rotational movement of the correcting lens be changed depending on a position of the lens units in the optical axis direction in order to optimize the optical performance.

In the configuration disclosed in Japanese Patent Laid-open No. H09-105973, however, the position of the spherical center of the rotational movement of the correcting lens is fixed. In other words, the radius of curvature of the spherical surface where the correcting lens rotationally moves is constant. Accordingly, in the configuration disclosed in Japanese Patent Laid-open No. H09-105973, it is difficult to optimize the optical performance when the correcting lens is rotationally moved depending on the position of the lens units in the optical axis direction.

SUMMARY OF THE INVENTION

The present invention provides an image stabilizer, a lens apparatus, and an image pickup apparatus that improve optical performance.

An image stabilizer as one aspect of the present invention includes a movable member holding a lens, a tilting unit configured to rotate around a predetermined point to tilt the movable member relative to an optical axis, and a driving unit configured to move a position in an optical axis direction of the movable member relative to the tilting unit, and the movable member is configured to tilt such that a radius of curvature around the predetermined point varies according to the position in the optical axis direction.

A lens apparatus as another aspect of the present invention includes the image stabilizer.

An image pickup apparatus as another aspect of the present invention includes the lens apparatus and an image pickup element configured to photoelectrically convert an optical image formed via the lens apparatus to output an image signal.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings. In each of the drawings, the same elements will be denoted by the same reference numerals and the duplicate descriptions thereof will be omitted.

Embodiment 1

Figure 1:
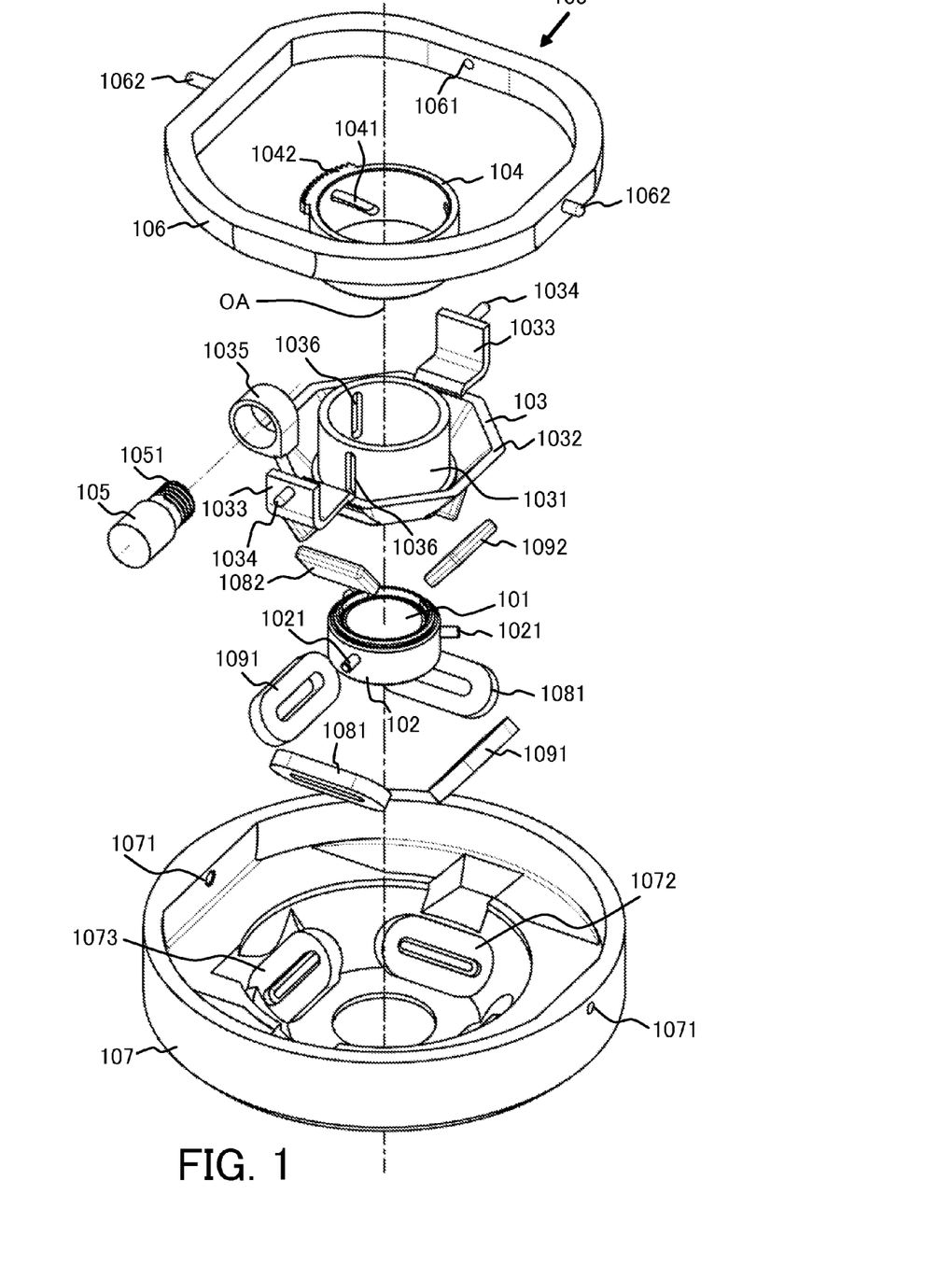
FIG. 1 is an exploded perspective view of an image stabilizer in Embodiment 1.
Figure 2:
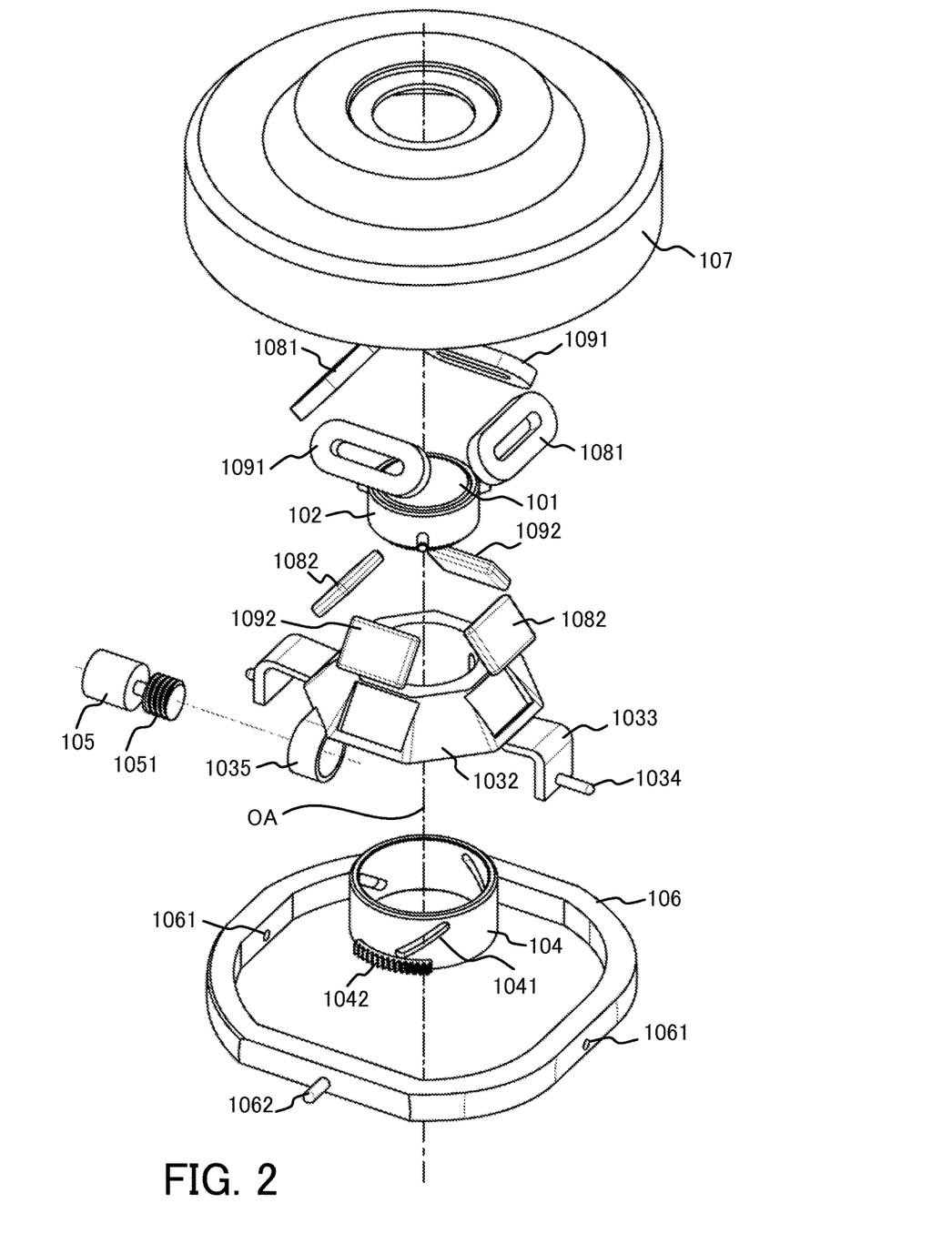
FIG. 2 is an exploded perspective view (view from the bottom) of the image stabilizer in Embodiment 1.
Figure 3:
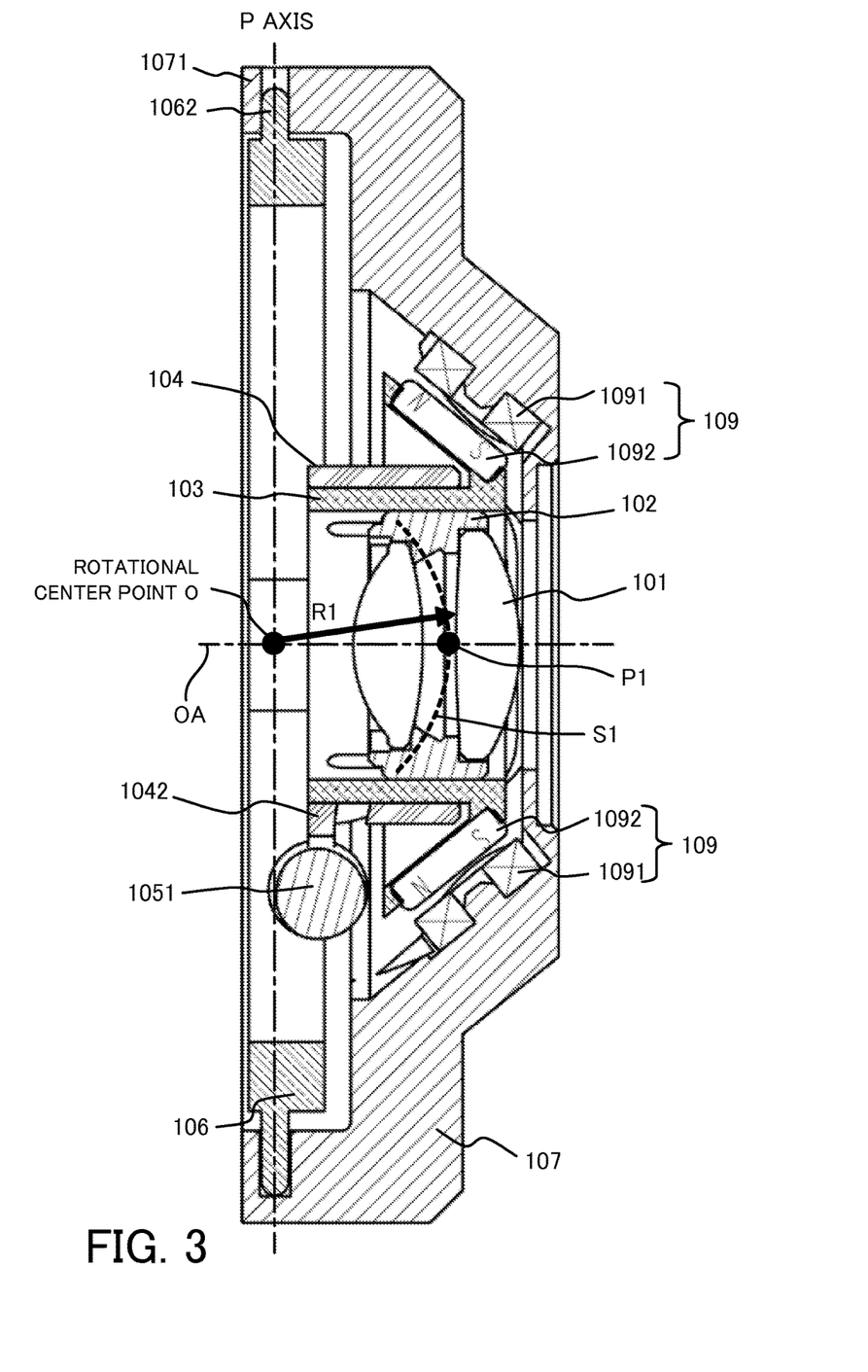
FIG. 3 is a cross-sectional view of the image stabilizer in Embodiment 1.
Figure 4:
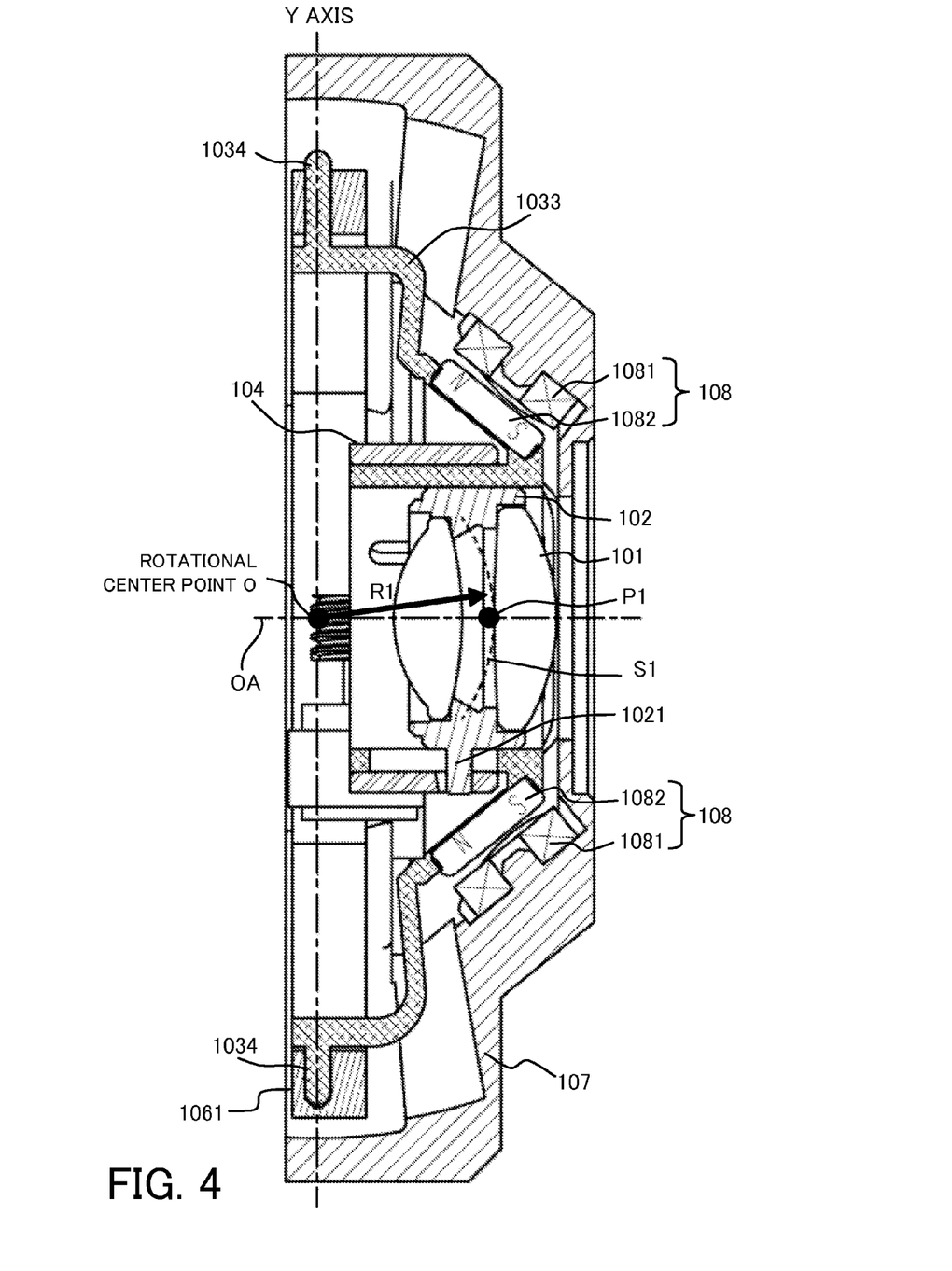
FIG. 4 is a cross-sectional view (cross-sectional view that is orthogonal to the view of FIG. 3) of the image stabilizer in Embodiment 1.
Figure 5:
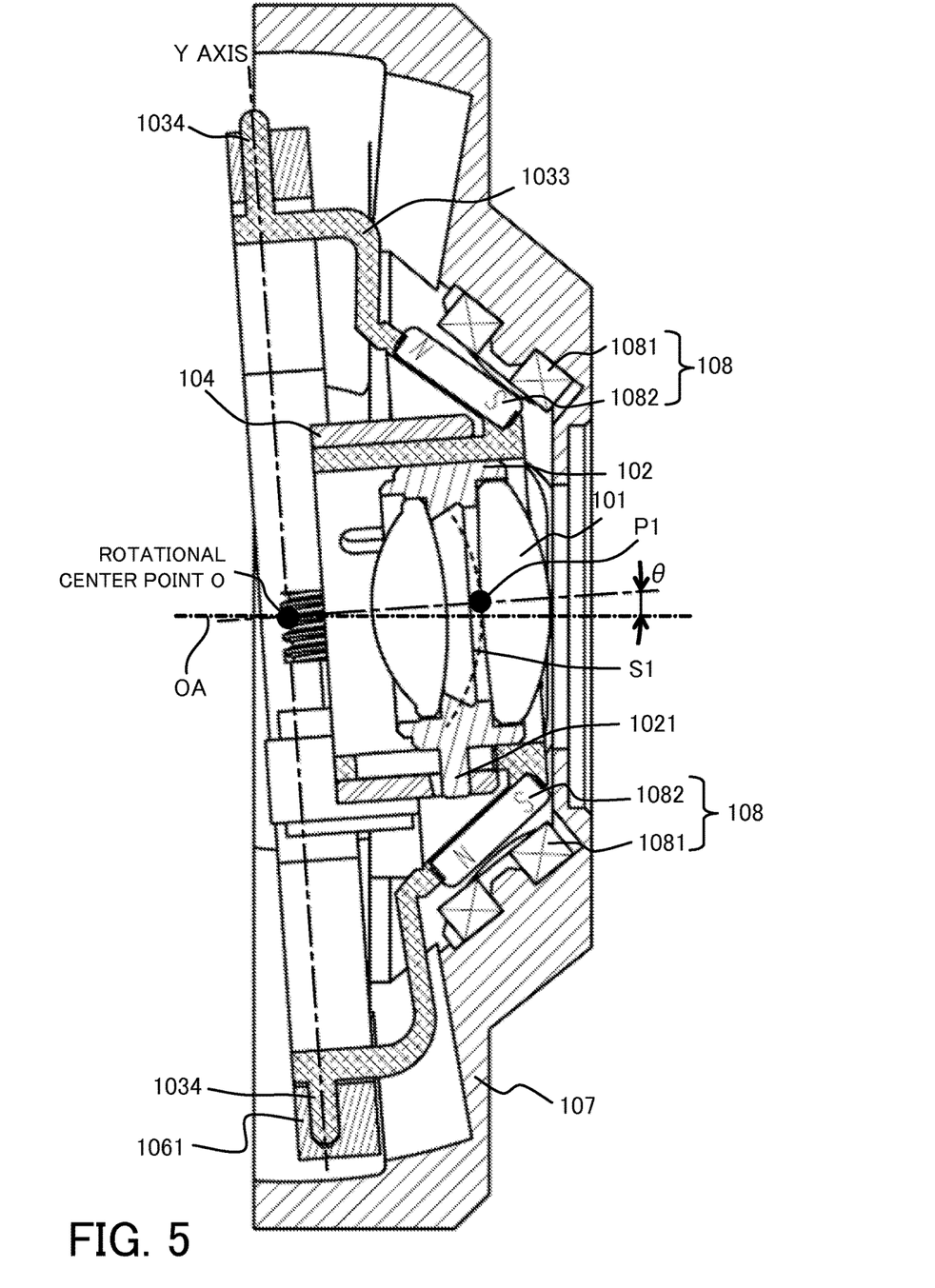
FIG. 5 is a diagram of illustrating a state where a tilt driving mechanism is driven in a pitch direction from a state of FIG. 4 in Embodiment 1.
Figure 6:
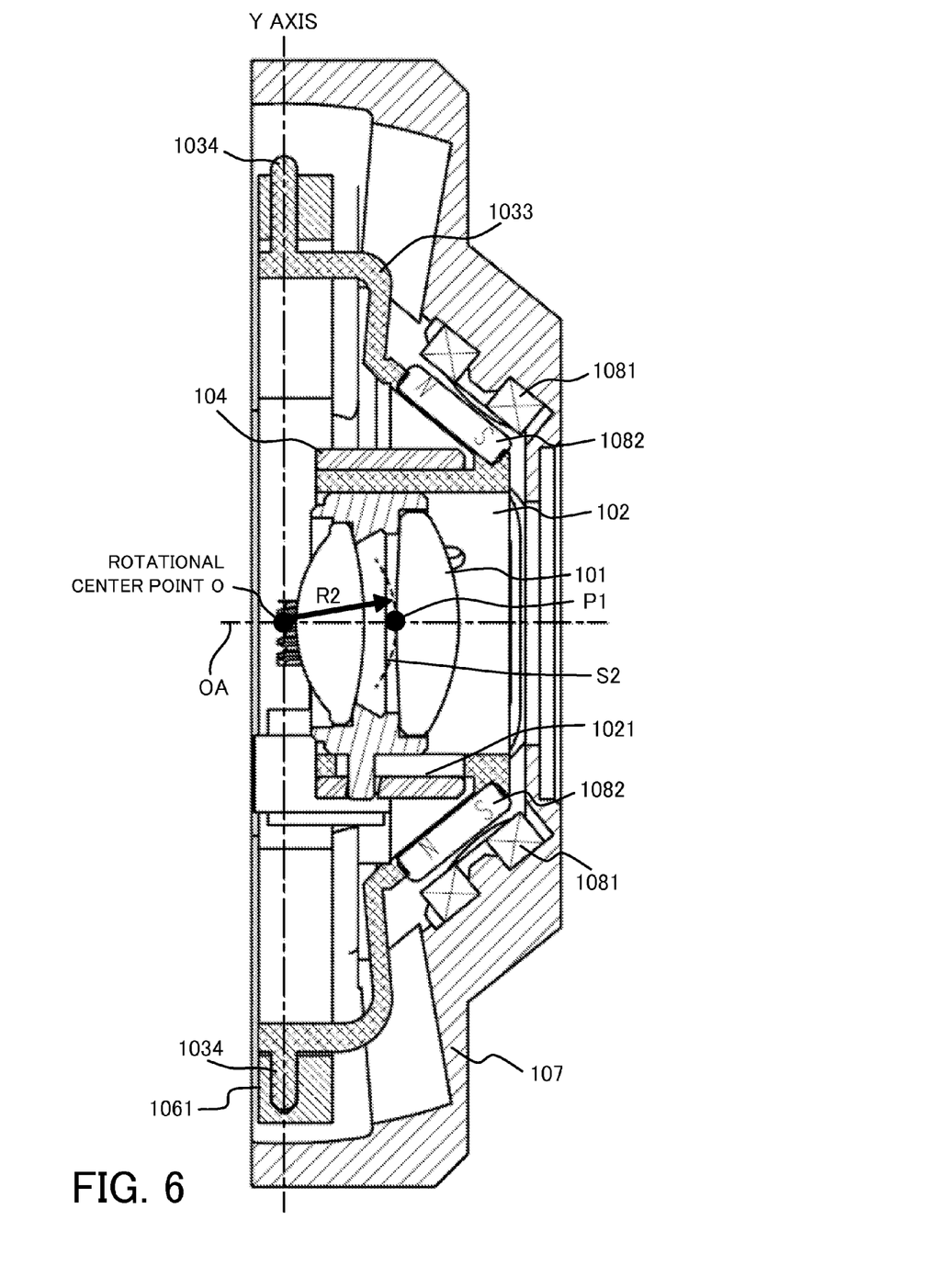
FIG. 6 is a diagram of illustrating a state where a position of a correcting lens is changed from the state of FIG. 4 in Embodiment 1.

First of all, referring to FIGS. 1 to 6, an image stabilizer 100 (image-blur correcting apparatus) in Embodiment 1 of the present invention will be described. FIG. 1 is an exploded perspective view of the image stabilizer 100 in this embodiment. FIG. 2 is an exploded perspective view of the image stabilizer 100, and illustrates the image stabilizer 100 illustrated in FIG. 1 when seen from the bottom. FIG. 3 is a cross-sectional view of the image stabilizer 100, and illustrates a cross section along an optical axis direction. FIG. 4 is a cross-sectional view of the image stabilizer 100, and illustrates a cross section of a plane orthogonal to the cross section of FIG. 3. FIG. 5 is a cross-sectional view of the same plane as that of FIG. 4, and illustrates a state where a tilt driving mechanism is driven in a pitch direction from the state of FIG. 4. FIG. 6 is a cross-sectional view of the same plane as that of FIG. 4, and illustrates a state where a position of a correcting lens 101 is changed from the state of FIG. 4.

As illustrated in FIGS. 1 to 6, the image stabilizer 100 includes a correcting lens 101, a lens frame 102, a tilting member 103, a cam cylinder 104, a straight driving portion 105, a gimbal ring 106, a fixed member 107, a first driving unit 108, and a second driving unit 109. The first driving unit 108 includes a first coil 1081 and a first magnet 1082. The second driving unit 109 includes a second coil 1091 and a second magnet 1092.

Subsequently, each of components of the image stabilizer 100 will be described. The correcting lens 101 (correcting member or optical system) moves along a spherical surface around a rotation center point O as a spherical center on the optical axis OA. The correcting lens 101 constitutes part of an image pickup optical system and is capable of moving a relative position of an image formed by the image pickup optical system with respect to an image pickup unit (image pickup element) which is not illustrated. Accordingly, when a hand shake or the like is detected, a stability on an image plane can be ensured. In this embodiment, the correcting member is constituted by two lenses, but is not limited to this. This embodiment can be configured to drive the image pickup element or a prism as a correcting member.

In this embodiment, a virtual line that passes through the rotation center point O and that is orthogonal to the optical axis OA of the image pickup optical system is defined as a pitch axis (P axis illustrated in FIG. 3). Furthermore, a virtual line that passes through the rotation center point O and that is orthogonal to both the optical axis OA and the pitch axis (P axis) is defined as a yaw axis (Y axis illustrated in FIG. 4). In this embodiment, an axis which rotates around the pitch axis (P axis) is referred to as a pitch rotating shaft (first rotating shaft), and an axis which rotates around the yaw axis (Y axis) is referred to as a yaw rotating shaft (second rotating shaft). The left side in FIG. 3 is defined as a front side of the image stabilizer 100.

The lens frame 102 (movable member) has a cylindrical shape (substantially cylindrical shape) and holds the correcting lens 101 (optical system) in an opening formed at its center. The lens frame 102 is provided with three dowels 1021 that extend in radial directions. The tilting member 103 (tilting unit) is configured to rotate around a predetermined point such that the lens frame 102 tilt with respect to the optical axis OA. In this embodiment, the tilting member 103 includes a lens frame holder 1031, a magnet holder 1032, an arm portion 1033, a yaw rotating shaft 1034, and a motor fixing member 1035.

The lens frame holder 1031 has a cylindrical shape (substantially cylindrical shape) and holds the lens frame 102 on its inside. The lens frame holder 1031 has three straight grooves 1036. The straight grooves 1036 are capable of fitting the dowels 1021 and support the lens frame 102 so as to be straight movable in a direction of the optical axis OA (optical axis direction) of the correcting lens 101. The lens frame holder 1031, on its outside, rotatably supports the cam cylinder 104. The magnet holder 1032 has substantially an eight-sided pyramid shape as illustrated in FIG. 2, and on its side holds a first magnet 1082 and a second magnet 1092. The arm portion 1033 is, as illustrated in FIGS. 1 and 4, two arms each of which has an L-shaped cross section that protrudes from the magnet holder 1032, and is provided with the yaw rotating shaft 1034 on its both sides. The yaw rotating shaft 1034 (second rotating shaft) is an axis that has a cylindrical shape rotatable around the yaw axis (Y axis). The motor fixing member 1035 is attached to the magnet holder 1032 and fixes the straight driving portion 105. In other words, the straight driving portion 105 is held by the tilting member 103.

The cam cylinder 104 has a cylindrical shape (substantially cylindrical shape) and is rotatably supported with respect to the tilting member 103. The cam cylinder 104 has a cam groove 1041 and a gear portion 1042. The cam groove 1041 is three spiral grooves into which the three dowels 1021 fit, and the rotation of the cam cylinder 104 enables the lens frame 102 to move forward and backward in a direction of the rotating shaft. The gear portion 1042 screws with a worm gear 1051 that is attached to the straight driving portion 105. The straight driving portion 105 is a driving unit that moves a position of the tilting member 103 in the optical axis direction, and is a stepping motor in this embodiment. An output shaft of the straight driving portion 105 is provided with the worm gear 1051, which rotates the cam cylinder 104 by a predetermined amount in accordance with receiving power and a target signal from an external device.

The gimbal ring 106 (intermediate member) has an annular shape (substantially annular shape). The gimbal ring 106 has a yaw bearing 1061 that has the yaw axis (Y axis) as a center axis, and a pitch rotating shaft 1062 (first rotating shaft) that has the pitch axis (P axis) as a center axis. The fixed member 107 has a cylindrical shape (substantially cylindrical shape) and an opening in its center can be used as an optical path of the correcting lens 101. The fixed member 107 is fixed on a lens barrel that holds other lens units of the image pickup optical system. The fixed member 107 has a pitch bearing 1071 that has the pitch axis (P axis) as a center axis. The fixed member 107 also has a first coil receiving portion 1072 that holds the first coil 1081 and a second coil receiving portion 1073 that holds the second coil 1091.

The first driving unit 108 is a voice coil motor. As illustrated in FIG. 4, two voice coil motors are arranged so as to sandwich the correcting lens 101 therebetween. Accordingly, the image stabilizer 100 can be reduced in size. The first coil 1081 is a winding coil that has an oval shape and is attached to the fixed member 107. One surface of the first coil 1081 is opposed to, i.e. faces, a magnetized surface of the first magnet 1082.

The first magnet 1082 is a magnet that has a shape of a cuboid, and is attached to the tilting member 103. A facing surface of the first magnet 1082 facing the first coil 1081 is divided into two parts at its center, which are a north pole and a south pole respectively, and the facing surface is magnetized so that a normal direction of the facing surface is a direction of the magnetic pole. Its opposite surface may be magnetized to be a magnetic pole opposite to that of the facing surface facing the first coil 1081, or may not be magnetized if a thickness of the magnet is sufficiently thick or the like. The normal that passes through a center of the magnetized surface is set to pass through the rotation center point O. When the first coil 1081 is energized by a drive controller (not illustrated), the Lorentz force is generated in a direction orthogonal to the magnetized direction and the energized direction of the first magnet 1082. As a result, a moment around the pitch axis is generated between the fixed member 107 and the tilting member 103. The second driving unit 109 is a voice coil motor. It has the same configuration as that of the first driving unit 108 except that a direction of the moment to be generated is a direction around the yaw axis. Therefore, detailed descriptions of the second driving unit 109 are omitted.

In this embodiment, types of the driving units are not limited. It has only to be configured to apply predetermined driving forces around the pitch axis and the yaw axis. In addition to the voice coil motor that is used in this embodiment, various methods of the driving units such as a stepping motor, an ultrasonic motor, and a motor or a bimorph using an electrostatic force are applicable.

Next, a mechanism of the image stabilizer 100 will be described. The gimbal ring 106 is supported so as to swing (rotatably) around the pitch axis as a center axis with respect to the fixed member 107, while the pitch rotating shaft 1062 is pivotally supported by the pitch bearing 1071. The tilting member 103 is supported so as to swing (rotatably) around the yaw axis as a center axis with respect to the gimbal ring 106, while the yaw rotating shaft 1034 (second rotating shaft) is supported by the yaw bearing 1061. As a result, the tilting member 103 is movably supported on a spherical surface around the rotation center point O as a spherical center with respect to the fixed member 107. In other words, the fixed member 107, the gimbal ring 106, and the tilting member 103 constitute so-called a gimbal mechanism. The gimbal mechanism functions as a tilt driving mechanism in this embodiment.

When the first coil 1081 that is held by the fixed member 107 is energized in this state, an electromagnetic force is generated between the first magnet 1082 that is held by the tilting member 103 and the first coil 1081. Accordingly, the tilting member 103 can be driven in a pitch direction. When the second coil 1091 is energized, an electromagnetic force is generated between the second magnet 1092 and the second coil 1091. Accordingly, the tilting member 103 can be driven in a yaw direction. Thus, when current-carrying amounts to the first coil 1081 and the second coil 1091 are set to predetermined amounts, the tilting member 103 can be positioned at a predetermined position on the spherical surface around the rotation center point O as a spherical center. In other words, the first driving unit 108 and the second driving unit 109 function as a swing driving unit.

FIG. 5 illustrates a state in which the tilt driving mechanism (the fixed member 107, the gimbal ring 106, and the tilting member 103) is driven around the pitch axis. It is an example where the tilt driving mechanism is driven by five degrees as its moving amount θ (rotation angle). As illustrated in FIG. 5, the gimbal ring 106 and the tilting member 103 are swung (rotated) relative to the fixed member 107.

Subsequently, a mechanism of changing a radius of curvature of the spherical surface along which the correcting lens 101 is movable will be described. The lens frame 102 that holds the correcting lens 101 is held with respect to the tilting member 103 while guiding the three dowels 1021 in the straight grooves 1036 and the cam grooves 1041. A position of the correcting lens 101 in the optical axis direction is determined according to the rotation of the cam cylinder 104. A rotation position of the cam cylinder 104 is determined by positioning the straight driving portion 105 at a predetermined angle. In other words, the lens frame 102, the tilting member 103, and the cam cylinder 104, and the straight driving portion 105 constitute a straight moving mechanism. In accordance with the operation of the straight moving mechanism, the position (position in the optical axis direction) of the lens frame 102 relative to the tilting member 103 can be operated (moved) from the state of FIG. 4 to the state of FIG. 6.

As described above, the tilting member 103 is movably supported on the spherical surface around the rotation center point O as a spherical center by the tilt driving mechanism. The position of the rotation center point O relative to the tilting member 103 does not change. The position of the correcting lens 101 relative to the tilting member 103 can be changed by the straight moving mechanism described above. Accordingly, distance between the correcting lens 101 and the rotation center point O, i.e. a radius of curvature of a spherical surface where the correcting lens 101 is movable can be changed.

Subsequently, referring to FIGS. 4 and 6, the change of the radius of curvature of the spherical surface where the correcting lens 101 is movable (the moving locus of the correcting lens 101 with reference to the rotation center point O) will be described. As illustrated in FIG. 4, when the lens frame 102 is moved to a rear side (right side in FIG. 4) by the straight moving mechanism, the radius of curvature of the spherical surface where the correcting lens 101 is movable increases. On the other hand, as illustrated in FIG. 6, when the lens frame 102 is moved to a front side (left side in FIG. 6) by the straight moving mechanism, the radius of curvature of the spherical surface where the correcting lens 101 is movable decreases.

In this embodiment, as a representative point of the correcting lens 101, an apex P1 of the front-side (left-side) lens surface of the rear-side correcting lens 101 (right-side lens of the two correcting lens in the drawing) is selected. In FIGS. 4 and 6, loci of the apex P1 of the correcting lens 101 are indicated as dashed lines S1 and S2 (spherical surfaces), respectively. In the state of FIG. 4, the correcting lens 101 is movable on the spherical surface S1 having a radius R1 (first radius of curvature). On the other hand, in the state of FIG. 6, the correcting lens 101 is movable on the spherical surface S2 having a radius R2 smaller than the radius R1 (radius R2 that is small by a moving amount of the lens frame 102 in the optical axis direction, or second radius of curvature). According to the configuration of this embodiment, the radius of curvature of the spherical surface where the correcting lens 101 is movable (moving locus of the correcting lens 101 with reference to the rotation center point O) can be changed.

In this embodiment, the tilting member 103 functions as part of the straight moving mechanism in the lens frame holder 1031 and functions as part of the tilt driving mechanism in the yaw rotating shaft 1034. Thus, a structure in which the tilt driving mechanism holds the straight moving mechanism is realized. When the position of the correcting lens 101 in the optical axis direction relative to the lens barrel needs to be fixed, a position of the entirety of the apparatus relative to the lens barrel can be moved in the opposite direction by the travel distance of the straight moving mechanism.

According to this embodiment, the radius of curvature of the spherical surface where the correcting lens 101 (correcting member) is movable can be changed. Preferably, the radius of curvature can be continuously changed. Specifically, the lens frame 102 is moved forward and backward in the optical axis direction by using the straight moving mechanism such that the radius of curvature of the spherical surface where the correcting lens 101 is movable can be changed. In this case, the distance between the rotation center point O and the correcting lens 101 can be continuously changed. Therefore, the radius of curvature can be arbitrary set within a moving range of the lens frame 102.

In accordance with the change of the radius of curvature, a ratio of a moving amount in a direction orthogonal to the optical axis OA and a tilting amount relative to the optical axis OA can be changed. As a result, when a position relation in the optical axis direction of the image pickup optical system is changed due to a magnification-varying operation (zooming operation) or a focusing operation, the radius of curvature of the spherical surface where the correcting lens 101 is movable can be accordingly set to a value by which the optical performance is improved.

In this case, setting the rotation center point O to be included in the moving range of the lens frame 102 enables inversion of plus and minus signs of the radius of curvature depending on the movement of the lens frame 102. In other words, when the lens frame 102 is located at an object side relative to the rotation center point O, the spherical surface where the correcting lens 101 is movable is a spherical surface convex toward the object side. On the other hand, when the lens frame 102 is located at an imaging plane side relative to the rotation center point O, the spherical surface where the correcting lens 101 is movable is a spherical surface convex toward the imaging plane side.

Embodiment 2

Next, referring to FIGS. 7 to 9, Embodiment 2 of the present invention will be described. In this embodiment, the same elements as those in Embodiment 1 will be denoted by the same reference numerals and the duplicate descriptions thereof will be omitted.

Figure 7:
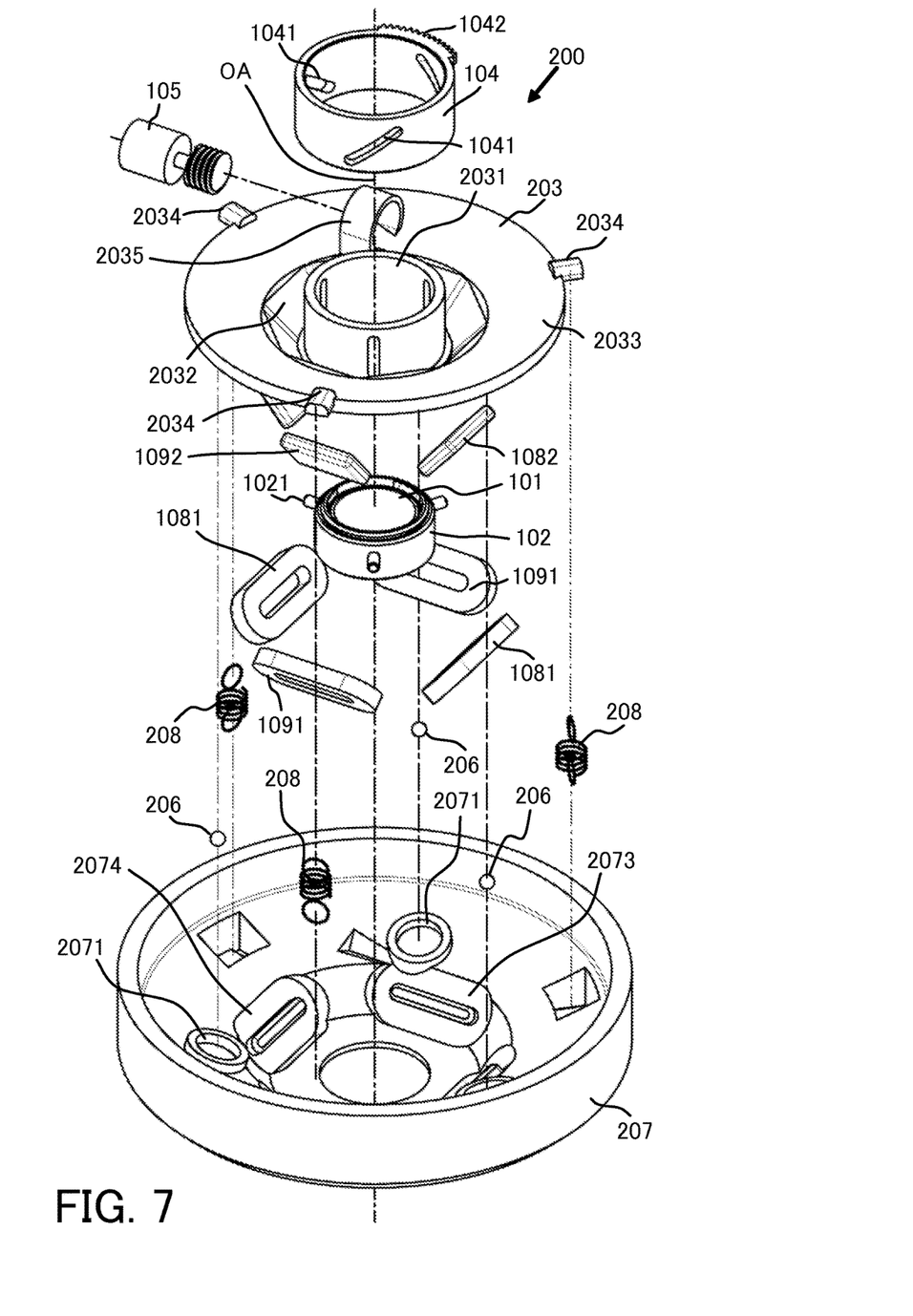
FIG. 7 is an exploded perspective view of an image stabilizer in Embodiment 2.
Figure 8:
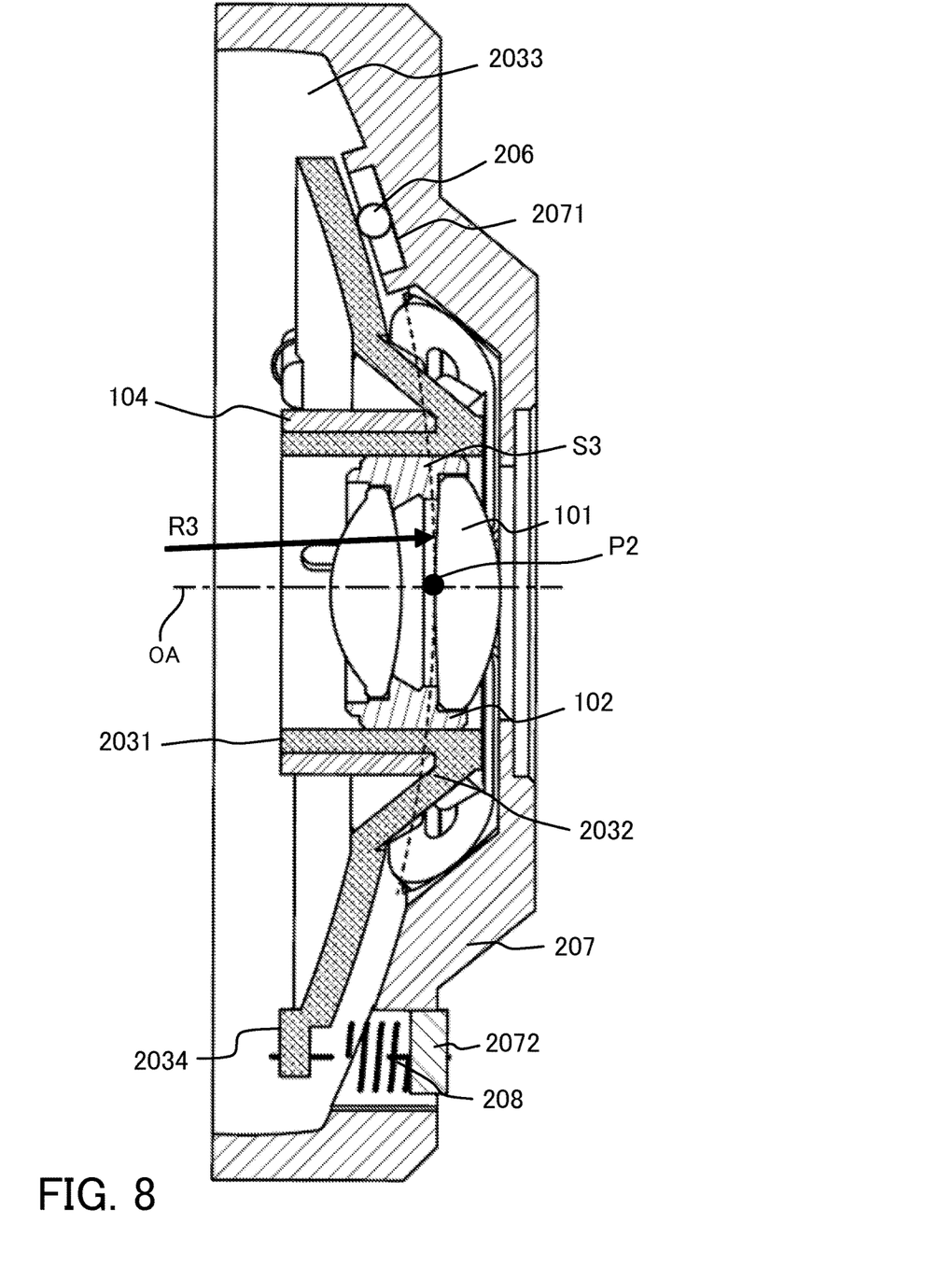
FIG. 8 is a cross-sectional view of the image stabilizer in Embodiment 2.

FIG. 7 is an exploded perspective view of an image stabilizer 200 in this embodiment. FIG. 8 is a cross-sectional view of the image stabilizer 200, and illustrates a cross section along the optical axis direction. FIG. 9 is a cross-sectional view of the same plane as that of FIG. 8, and illustrates a state where a position of the correcting lens 101 is changed from the state of FIG. 8. The image stabilizer 200 of this embodiment includes the correcting lens 101, the lens frame 102, a tilting member 203, the cam cylinder 104, the straight driving portion 105, a rolling member 206, a fixed member 207, a biasing spring 208, the first driving unit 108, and the second driving unit 109.

The tilting member 203 includes a lens frame holder 2031, a magnet holder 2032, a spherical portion 2033, a spring hook member 2034, and a motor fixing member 2035. Since the lens frame holder 2031, the magnet holder 2032, and the motor fixing member 2035 are the same as the lens frame holder 1031, the magnet holder 1032, and the motor fixing member 1035, respectively, descriptions thereof are omitted. The spherical portion 2033 (first spherical portion), which has substantially a spherical shell shape, is provided at the periphery of the lens frame holder 2031, and its surface facing the fixed member 207 has a spherical surface around the rotation center point O as a spherical center. The three spring hook members 2034 are provided on the periphery of the spherical portion 2033, and fix one ends of the biasing springs 208.

The rolling member 206 is a ball member that rollably support the tilting member 203 with respect to the fixed member 207. In this embodiment, there are three rolling members 206, which are arranged at equal intervals along a circumferential direction around the optical axis OA. The rolling member 206 reduces a rolling resistance and is made of a material having a high hardness such as a stainless steel or a ceramic material because it is manufactured with high processing accuracy.

The fixed member 207 has a substantially cylindrical shape, and is fixed on a lens barrel that fixes other lens units (not illustrated). An opening at the center of the fixed member 207 is used as an optical path of the correcting lens 101. The fixed member 207 has three ball receiving portions 2071 (second spherical portion), three spring hook members 2072, a first coil receiving portion 2073, and a second coil receiving portion 2074.

The ball receiving portions 2071 are provided equally in the circumferential direction, and each of their surfaces facing the tilting member 203 is formed to be a spherical surface. A radius of its surface is sum of the radius of the spherical portion 2033 and the diameter of the rolling member 206, and the rotation center point O is a spherical center of the radius. The periphery of the ball receiving portion 2071 has a wall so as to prevent dropping out of the rolling member 206. The spring hook member 2072 fixes one end of the biasing spring 208. The first coil receiving portions 2073 are provided on two places and hold the first coil 1081. The second coil receiving portions 2074 are provided on two places and hold the second coils 1091.

The biasing spring 208 is constituted by a tension coil spring, and its one end is hooked by the spring hook member 2034 of the tilting member 203 and the other end is hooked by the spring hook member 2072 of the fixed member 207. As a result, a biasing force is generated in a direction in which the tilting member 203 and the fixed member 207 come close to each other. According to the biasing force, the rolling member 206 is held between the tilting member 203 and the fixed member 207 and is capable of keeping a contact state. In this embodiment, the biasing force is applied by using an elastic force of the spring, and an electrostatic force or a magnetic force may be used as the biasing force.

Subsequently, a specific configuration of this embodiment will be described. The biasing springs 208 are fixed to the respective spring hook members 2034 and 2072, and accordingly the biasing force is applied between the fixed member 207 and the tilting member 203. The three rolling members 206 are held by the biasing force, and accordingly positions in the optical axis direction of the rolling member 206 and the tilting member 203 relative to the fixed member 207 are stably determined. As a result, the tilting member 203 is rollably supported with respect to the fixed member 207 while the spherical portion 2033 and the ball receiving portion 2071 keep a concentric state at the rotation center point O.

When the first driving unit 108 and the second driving unit 109 are driven by predetermined amounts in this state, the positions on the pitch axis and the yaw axis of the tilting member 203 with respect to the fixed member 207 can be determined. In other words, the spherical portion 2033, the ball receiving portion 2071, the rolling member 206, and the biasing spring 208 constitute the tilt driving mechanism. The configurations other than the tilt driving mechanism of the image stabilizer 200 are the same as those of Embodiment 1. Therefore, this embodiment can obtain the same effect as that of Embodiment 1. In other words, when the lens frame 102 is moved to the rear side (right side in FIG. 8, or image plane side) by using the straight moving mechanism as illustrated in FIG. 8, the radius of curvature of the spherical surface where the correcting lens 101 is movable (moving locus of the correcting lens 101) can be increased. Similarly to Embodiment 1, as a representative point of the correcting lens 101, an apex P2 of the front-side (left-side) lens surface of the rear-side correcting lens 101 (right-side lens of two lenses in FIG. 8) is selected. The locus of the apex P2 of the correcting lens 101 in this case is indicated as a dashed line S3.

Figure 9:
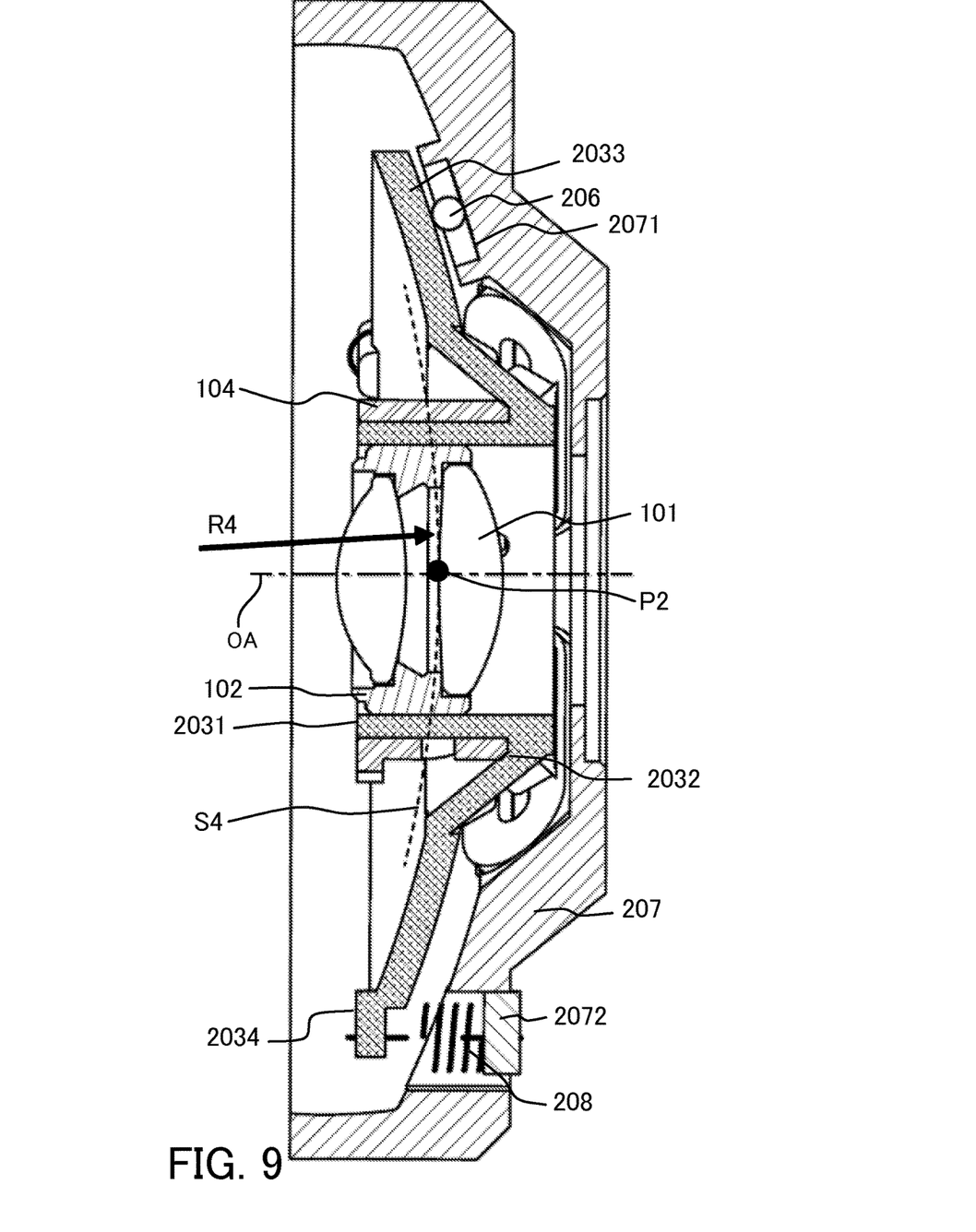
FIG. 9 is a diagram of illustrating a state where a position of a correcting lens is changed from a state of FIG. 7 in Embodiment 2.

On the other hand, as illustrated in FIG. 9, when the lens frame 102 is moved to the front side (left side in FIG. 9, or object side) by using the straight moving mechanism, the radius of curvature of the spherical surface where the correcting lens 101 is movable can be decreased. The locus of the apex P2 of the correcting lens 101 in this case is indicated as a dashed line S4. In the state of FIG. 8, the correcting lens 101 is movable on the spherical surface S3 having a radius R3 (first radius of curvature). On the other hand, in the state of FIG. 9, the correcting lens 101 is movable on the spherical surface S4 having a radius R4 (second radius of curvature) smaller than the radius R3 by the moving amount in the optical axis direction. According to this embodiment, the radius of curvature of the spherical surface where the correcting lens 101 is movable (moving locus of the correcting lens 101) can be changed.

In this embodiment, the tilting member 203 is rollably supported by using the rolling member 206. This embodiment, however, is not limited to this, and a spherical surface provided on the tilting member 203 may be directly and slidably supported with respect to a spherical surface provided on the fixed member 207. Accordingly, when the influence caused by generation of a sliding friction is small, the number of parts required for the image stabilizer can be reduced.

When the gimbal mechanism is used as described in Embodiment 1, the rotation center point O is included in the image stabilizer 100. Accordingly, it is suitably used if the maximum value of the radius of curvature is nearly equal to the thickness of the image stabilizer 100 in the optical axis direction. On the other hand, when the tilt driving mechanism is used as described in this embodiment, the rotation center point O can be set to the outside of the image stabilizer 200. Accordingly, if the maximum value of the radius of curvature is greater than the thickness of the image stabilizer 200 in the optical axis direction, the configuration of this embodiment is advantageous.

Figure 10:
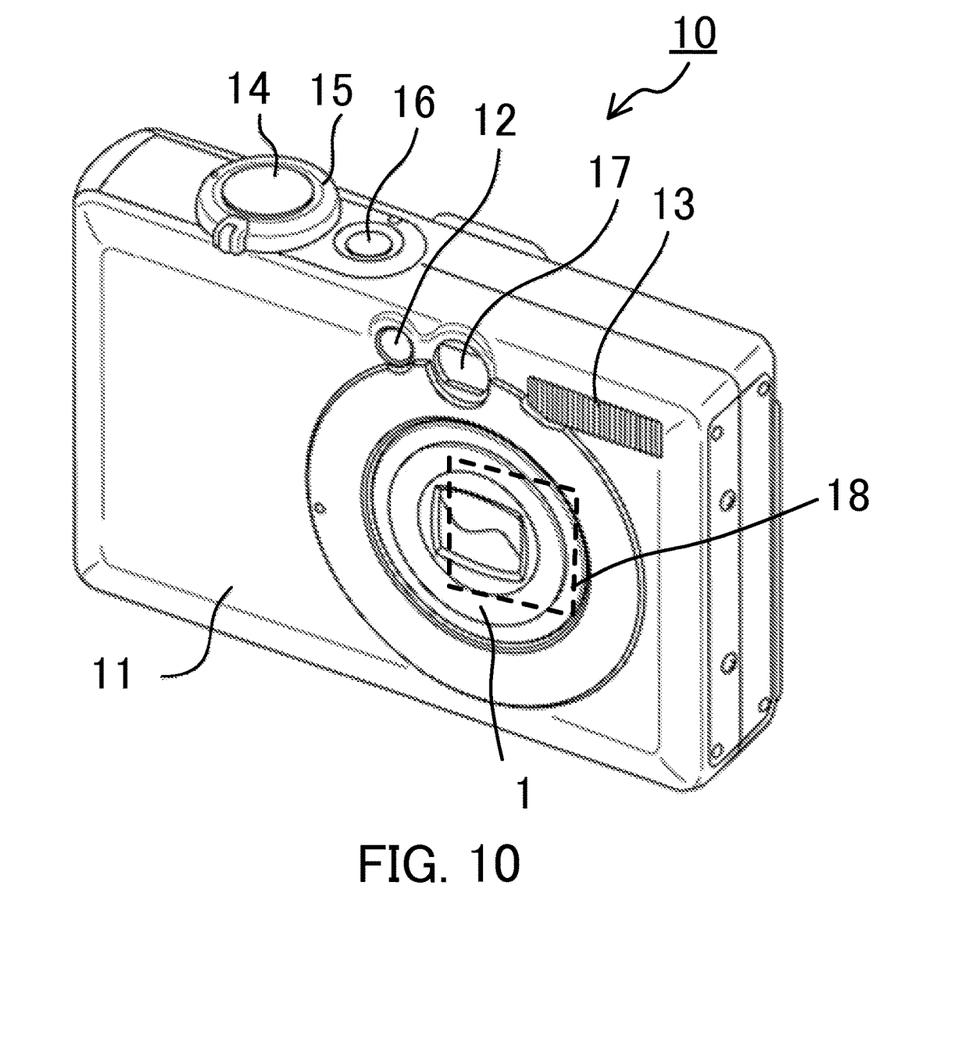
FIG. 10 is an external perspective view of an image pickup apparatus in each embodiment.

Next, referring to FIG. 10, outlines of a lens apparatus and an image pickup apparatus including the image stabilizer in each embodiment (image stabilizer 100 or 200) will be described. FIG. 10 is an external perspective view of an image pickup apparatus 10 (digital camera). As illustrated in FIG. 10, the image pickup apparatus 10 includes an image pickup apparatus body 11 and a lens barrel 1 (lens apparatus) attached to the image pickup apparatus body 1. The image stabilizer of each embodiment is provided inside the lens barrel 1. The image pickup apparatus 10 includes, on its front face, a finder objective lens 17 that determines composition of an object, an auxiliary lighting unit 12 that assists a light source in a photometry operation or a ranging operation (focus detection), a strobe 13, and the lens barrel 1. The image pickup apparatus body 11 includes, on its top face, a release button 14, a zoom switch 15, and a power switching button 16. Reference numeral 18 denotes an image pickup element provided inside the image pickup apparatus body 11. The image pickup element 18 photoelectrically converts an object image (optical image) formed via the lens barrel 1 to output an image signal. In this embodiment, the lens barrel 1 is configured to be movable between a retracted state and an extended state (image shooting state).

In each embodiment, the lens frame 102 (movable member) is configured to tilt such that a radius of curvature around a predetermined point (rotation center point O) varies (changes) according to a position in the optical axis direction. Preferably, the lens frame 102 is configured to tilt along a moving locus on the spherical surface having the radius of curvature around the predetermined point. Preferably, the radius of curvature is a first radius of curvature (FIG. 4: R1, FIG. 8: R3) when the position of the lens frame 102 is located at a first distance from the predetermined point. The radius of curvature is a second radius of curvature (FIG. 6: R2, RGI. 9: R4) smaller than the first radius of curvature when the position of the lens frame 102 is located at a second distance smaller than the first distance from the predetermined point. More preferably, the lens frame 102 is configured such that the position is continuously variable in the optical axis direction.

Preferably, a tilting unit (tilting member 103) is configured to rotate around a first rotating shaft (pitch rotating shaft 1062) and a second rotating shaft (yaw rotating shaft 1034) that are orthogonal to the optical axis direction to tilt the lens frame 102. The predetermined point is a point (the rotation center point O) at which the first rotating shaft and the second rotating shaft intersect with each other on the optical axis OA. More preferably, the image stabilizer includes an intermediate member (gimbal ring 106) supported pivotally and rotatably around the first rotating shaft with respect to the fixed member 107, and the lens frame 102 is supported pivotally and rotatably around the second rotating shaft with respect to the intermediate member.

Preferably, the tilting unit (tilting member 203) includes a first spherical portion (spherical portion 2033) that has a spherical shape around the predetermined point. The fixed member 207 includes a second spherical portion (ball receiving portion 2071) that is supported rotatably with respect to the first spherical portion of the tilting unit.

According to each embodiment, a radius of curvature of a moving locus of an optical element used for the image stabilization can be variable in order to improve the optical performance of an image stabilizer, a lens apparatus, and an image pickup apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, a material, shape, size, number, or place of each member may be changed as appropriately. Each embodiment describes the image stabilizer which is equipped in an image pickup apparatus such as a digital camera and a digital video camera or an optical apparatus such as an interchangeable lens used for a digital single-lens reflex camera, but is not limited to this. For example, each embodiment is applicable also to an image stabilizer which is equipped in an observation apparatus (optical apparatus) such as binoculars, a telescope, and a field scope.

This application claims the benefit of Japanese Patent Application No. 2014-001282, filed on Jan. 8, 2014, which is hereby incorporated by reference wherein in its entirety.

What is claimed is:

1. An image stabilizer comprising:
   a movable member holding a lens;
   a tilting unit holding the movable member and configured to rotate around a predetermined point to tilt the movable member relative to an optical axis; and
   a driving unit configured to move a position in an optical axis direction of the movable member relative to the tilting unit,
   wherein the tilting unit is configured to rotate around a first rotating shaft and a second rotating shaft that are orthogonal to the optical axis direction to tilt the movable member,
   wherein the driving unit is configured to move the position in the optical axis direction of the movable member relative to the tilting unit without changing positions of the first rotating shaft and the second rotating shaft, and
   wherein the movable member is configured to tilt such that a radius of curvature around the predetermined point varies according to the position in the optical axis direction.

2. The image stabilizer according to claim 1, wherein the movable member is configured to tilt along a moving locus on a spherical surface having the radius of curvature around the predetermined point.

3. The image stabilizer according to claim 1, wherein:
   the radius of curvature is a first radius of curvature when the position of the movable member is located at a first distance from the predetermined point, and
   the radius of curvature is a second radius of curvature smaller than the first radius of curvature when the position of the movable member is located at a second distance smaller than the first distance from the predetermined point.

4. The image stabilizer according to claim 1, wherein the movable member is configured such that the position is continuously variable in the optical axis direction.

5. The image stabilizer according to claim 1, wherein:
the predetermined point is a point at which the first rotating shaft and the second rotating shaft intersect with each other on the optical axis.

6. The image stabilizer according to claim 5, further comprising:
a fixed member; and
an intermediate member supported rotatably around the first rotating shaft with respect to the fixed member,
wherein the movable member is supported rotatably around the second rotating shaft with respect to the intermediate member.

7. The image stabilizer according to claim 1, further comprising a fixed member, wherein:
the tilting unit includes a first spherical portion that has a spherical shape around the predetermined point, and
the fixed member includes a second spherical portion that is supported rotatably with respect to the first spherical portion of the tilting unit.

8. The image stabilizer according to claim 1, wherein the driving unit is held by the tilting unit.

9. A lens apparatus comprising the image stabilizing apparatus according to claim 1.

10. An image pickup apparatus comprising:
the lens apparatus according to claim 9; and
an image pickup element configured to photoelectrically convert an optical image formed via the lens apparatus to output an image signal.

* * * * *